United States Patent
Mizuno (10) Patent No.: US 6,959,445 B2
(45) Date of Patent: Oct. 25, 2005

(54) DISK DRIVE APPARATUS WITH INCLINED CLAMP RELEASE FUNCTION

(75) Inventor: Hajime Mizuno, Chiba (JP)

(73) Assignee: Sony Corporation, Tokyo (JP)

( * ) Notice: Subject to any disclaimer, the term of this patent is extended or adjusted under 35 U.S.C. 154(b) by 203 days.

(21) Appl. No.: 10/169,109

(22) PCT Filed: Nov. 14, 2001

(86) PCT No.: PCT/JP01/09959

§ 371 (c)(1),
(2), (4) Date: Aug. 13, 2002

(87) PCT Pub. No.: WO02/41312

PCT Pub. Date: May 23, 2002

(65) Prior Publication Data

US 2003/0002401 A1 Jan. 2, 2003

(30) Foreign Application Priority Data

Nov. 14, 2000 (JP) .............................. 2000-347189

(51) Int. Cl.[7] .............................................. G11B 7/09
(52) U.S. Cl. ................................................... 720/690
(58) Field of Search ........................... 369/30.95, 75.2; 720/690

(56) References Cited

U.S. PATENT DOCUMENTS

| | | | | |
|---|---|---|---|---|
| 4,654,840 A | * | 3/1987 | Takahashi | 369/75.2 |
| 4,680,748 A | * | 7/1987 | Kobayashi | 369/77.1 |
| 5,128,918 A | * | 7/1992 | Suzuki et al. | 369/77.1 |
| 5,528,442 A | * | 6/1996 | Hisatomi | 369/191 |
| 5,583,839 A | * | 12/1996 | Choi | 369/75.2 |
| 5,781,523 A | * | 7/1998 | Ozawa et al. | 369/75.1 |
| 5,812,510 A | * | 9/1998 | Son | 369/75.1 |
| 6,246,643 B1 | * | 6/2001 | Satoh et al. | 369/30.85 |

FOREIGN PATENT DOCUMENTS

| | | |
|---|---|---|
| JP | 056060/1989 | 4/1989 |
| JP | 7-134855 | 5/1995 |
| JP | 8-007466 | 1/1996 |
| JP | 8-167206 | 6/1996 |
| JP | 8-221859 | 8/1996 |
| JP | 10-255362 | 9/1998 |

* cited by examiner

Primary Examiner—David Davis
(74) Attorney, Agent, or Firm—Oblon, Spivak, McClelland, Maier & Neustadt, P.C.

(57) ABSTRACT

The present invention provides a disc drive apparatus including a rotation drive mechanism for driving or rotating an optical disc, which has a disc table onto which the optical disc is to be placed, and a motor for rotating the disc table, a clamp member for clamping the optical disc jointly with the disc table, the optical disc being placed on the disc table, and a hold mechanism for rotatably holding the clamp member, which causes the clamp member to shift toward the disc table with the axis of the clamp member being substantially parallel to the axis of the disc table when the clamp member clamps the optical disc jointly with the disc table, and causes-the clamp member to shift away from the disc table with the axis of the clamp member being inclined against the axis of the disc table when the clamp member releases the clamp state of the optical disc clamped by the clamp member and the disc table.

9 Claims, 8 Drawing Sheets

DISK DRIVE APPARATUS WITH INCLINED CLAMP RELEASE FUNCTION

TECHNICAL FIELD

The present invention relates to a disc drive apparatus for recording and/or reproducing information to/from optical discs including magneto-optical discs using an optical device.

BACKGROUND ART

Conventionally, there have been employed disc players for reproducing information recorded on optical discs including magneto-optical discs.

Figure 1:
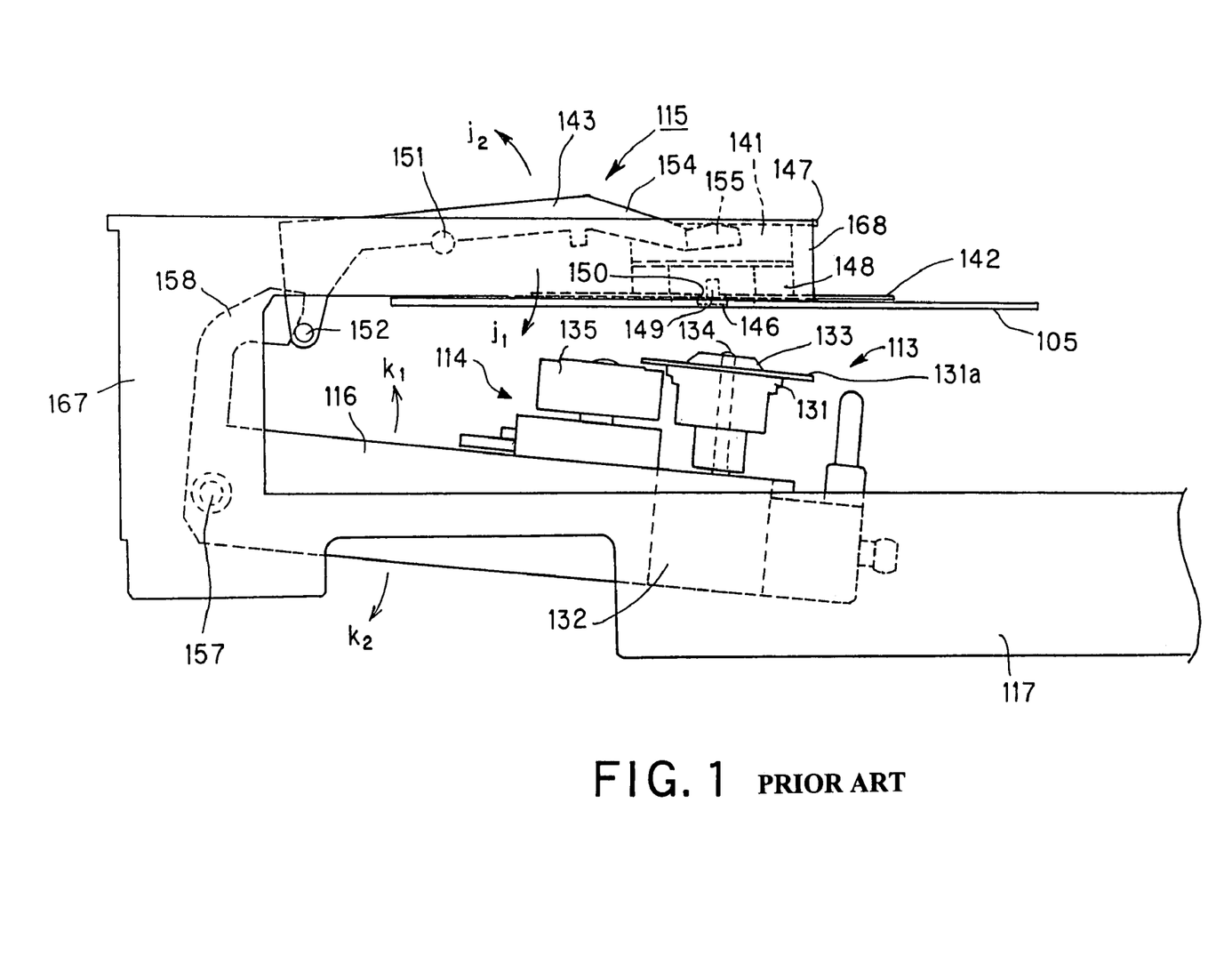
FIG. 1 shows a side view of a conventional clamp mechanism.

FIG. 1 shows the configuration of an example of such disc players, which includes a disc rotation drive mechanism 113 for driving or rotating an optical disc 105, a reproduction mechanism 114 for reproducing information recorded on the optical disc 105, a clamp mechanism 115 for rotatably clamping the optical disc 105, a support stand 116 for supporting the disc rotation drive mechanism 113 and the reproduction mechanism 114, and a support base 117 for supporting the clamp mechanism 115 and the support stand 116.

The disc rotation drive mechanism 113 includes a disc table 131 onto which the optical disc 105 is placed for loading, and a spindle motor 132 for driving or rotating the disc table 131, as shown in FIG. 1. The disc table 131 is substantially of a cylindrical shape, and is made of metallic material having magnetism. The disc table 131 has a disc placement member 131a in the shape of a flange at the outer circumference of one cylinder end thereof, onto which the optical disc 105 is to be placed. Also, at the same cylinder end, the disc table 131 has an engagement member 133 substantially of a cylindrical shape at the inner circumference thereof, which is to be engaged with a center hole of the optical disc 105. The spindle motor 132 has a spindle shaft 134 which penetrates the disc table 131. The end of the spindle shaft 134 protrudes from the top surface of the engagement member 133 of the disc table 131.

The reproduction mechanism 114 includes an optical pickup 135 for reproducing information recorded on the optical disc 105, as shown in FIG. 1, and a shift mechanism, not shown, for causing the optical pickup 135 to shift along the radial direction of the optical disc 105. The optical pickup 135 includes an optical unit which has an objective lens for causing a laser beam to focus on the recording surface of the optical disc 105, and a lens shift unit for driving or shifting the objective lens.

The clamp mechanism 115 includes a clamp member 141 for rotatably clamping the optical disc 105, a clamp plate 142 in the shape of a disc which is to be abutted to the optical disc 105, and an operation arm 143 for causing the clamp member 141 to shift toward and away from the disc table 131, as shown in FIG. 1.

The clamp member 141 is substantially of a cylindrical shape, and includes an engagement protrusion 146 which is to be engaged with the inner circumference of the engagement member 133 of the disc table 131, and a flange 147 which is held by the operation arm 143, as shown in FIG. 1. The clamp member 141 has a magnet 148 in the shape of a crown at the outer circumference of the engagement protrusion 146, which attracts the disc placement member 131a of the disc table 131. The engagement protrusion 146 is substantially of a cylindrical shape, and is provided with a shaft hole 149 to which the end of the spindle shaft 134 is to be inserted. The flange 147 is arranged at the outer circumference of one end of the clamp member 141. The clamp plate 142 has an engagement hole 150 at its center portion, and the outer circumference of the engagement protrusion 146 of the clamp member 141 is engaged with the engagement hole 150.

Figure 2:
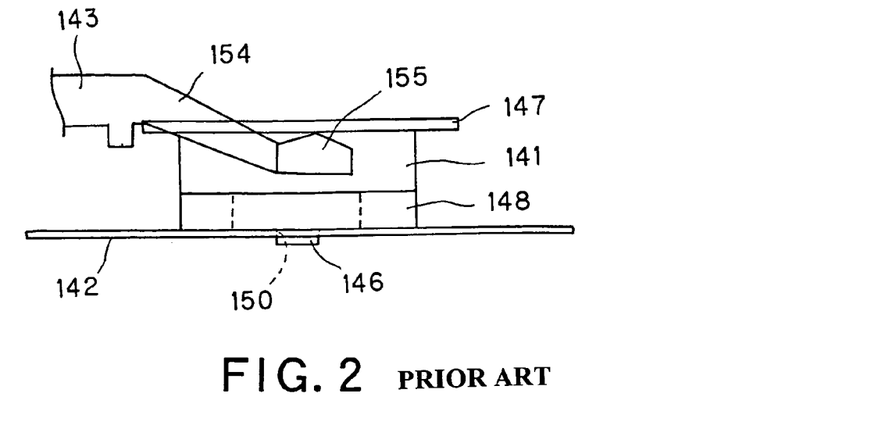
FIG. 2 shows a side view of the main portion of the conventional clamp mechanism.

The operation arm 143 has pivot shafts 151, 151 unitedly formed at substantially the halfway portion along the longitudinal direction of both opposite sides thereof, which is held by the support base 117, and allows the operation arm 143 to pivot along the directions of arrows $j_1$ and $j_2$ shown in FIG. 1. Also, the operation arm 143 has an operation shaft 152 at one end thereof, which is to be operated by the support stand 116 to cause the operation arm 143 to pivot along the $j_1$ and $j_2$ directions. The operation arm 143 has a pair of hold members 154, 154 for holding the flange 147 of the clamp member 141. The hold members 154, 154 have holders 155, 155, respectively, each substantially of a triangle shape in its cross section at the end thereof for holding the clamp member 141, as shown in FIG. 2. The holders 155, 155 are so arranged as to face the flange 147, and such that acute ends thereof are abutted to the flange 147.

The disc rotation drive mechanism 113 and the reproduction mechanism 114 are so arranged on the main surface of the support stand 116 as to face the clamp mechanism 115, respectively, as shown in FIG. 1. The support stand 116 has pivot shafts 157, 157 at one end thereof, which is held by the support base 117 and allows the support stand 116 to pivot along the directions of arrows $k_1$ and $k_2$ shown in FIG. 1. The support stand 116 has, at the same end, an operation member 158 in the shape of a hook for operating the operation shaft 152 of the operation arm 143. The support stand 116 is caused to pivot by a pivot mechanism, not shown, with the pivot shafts 157, 157 being its pivot center, and concurrently causes the operation arm 143 of the clamp mechanism 115 to pivot with the pivot shafts 151, 151 being its pivot center by means of the operation member 158.

The support base 117 is substantially of a U shape in its cross section, and has a rear member 167 which holds the pivot shafts 157, 157 for allowing the support stand 116 to pivot along the $k_1$ and $k_2$ directions, and a ceiling member 168 which holds the pivot shafts 151, 151 for allowing the operation arm 143 to pivot along the $j_1$ and $j_2$ directions.

When thus configured disc player reproduces information recorded on the optical disc 105, after the optical disc 105 is placed onto the disc table 131, the support stand 116 is caused to pivot along the $k_1$ direction shown in FIG. 1, while concurrently the operation arm 143 of the clamp mechanism 115 is caused to pivot along the $j_1$ direction shown in the same FIG. When the operation arm 143 of the clamp mechanism 115 is caused to pivot along the $j_1$ direction, the clamp member 141 held by the holders 155, 155 is caused to shift toward the optical disc 105. When the optical disc 105 placed on the disc table 131 is abutted to the clamp member 141, the optical disc 105 is rotatably clamped between the clamp member 141 and the disc table 131.

Then, the disc rotation drive mechanism 113 of the disc player drives or rotates the optical disc 105, and the optical pickup 135 of the reproduction mechanism 114 is caused to shift along the radial direction of the optical disc 105 to reproduce information recorded thereon.

On the other hand, when the disc player releases the clamp state of the optical disc 105 clamped by the clamp member 141, the support stand 116 is caused to pivot along the $k_2$ direction shown in FIG. 1, while concurrently the operation arm 143 of the clamp mechanism 115 is caused to pivot along the $j_2$ direction shown in the same FIG. When the operation arm 143 of the clamp mechanism 115 is caused to pivot along the $j_2$ direction, the clamp member 141 held by the holders 155, 155 is caused to shift away from the optical disc 105, thus the disc table 131 on which the optical disc 105 is placed and the clamp member 141 are caused to shift away from each other, which releases the clamp state of the optical disc 105.

As the optical disc 105, a CD-R (Recordable) to which information can be written once, or a CD-RW (ReWritable) whose information can be rewritten is used, which may have a backside label surface having no information onto which the user can print a desirable label.

Some kinds of printing inks of labels attached to the optical disc 105 may have adhesion. So, such a label surface of the optical disc 105 may undesirably stick to the clamp member 141, which brings about a problem that the optical disc 105 will not be released from the clamp member 141 when releasing the clamp state of the optical disc 105 clamped by the clamp member 141.

Also, Some CD (Compact Disc) rental shops may attach a management label to a CD for rent for managing CDs and customers. And, when such a management label is replaced with another one, there may remain adhesive at a portion to which the management label was attached, which also causes a label surface of a CD to have adhesion, and undesirably brings about the same problem.

As described above, with the conventional disc player, the optical disc 105 whose label surface has adhesion brings about a problem or malfunction of clamp operation.

To cope with the problem, the conventional disc player compulsorily detaches the clamp plate 142 from the optical disc 105 placed on the disc table 131.

However, when the clamp plate 142 is detached away vertically from a label surface of the optical disc 105 by the clamp mechanism 115, the clamp plate 142 have to be detached from the optical disc 105 over all the range where they are abutted to each other. So, with the conventional disc player, the clamp mechanism 115 is required to have or secure enough stiffness and drive ability, which inconveniently increases the clamp mechanism 115 and the whole apparatus in size.

DISCLOSURE OF THE INVENTION

Accordingly, the present invention has an object to overcome the above-mentioned drawbacks of the prior art by providing a disc drive apparatus which can prevent an optical disc from sticking to a clamp member when releasing the clamp state of the optical disc clamped by the clamp member, and can improve clamp operation for the optical disc by the clamp member.

The above object can be attained by providing a disc drive apparatus including:

a rotation drive mechanism for driving or rotating an optical disc, which has a disc table onto which the optical disc is to be placed, and a motor for rotating the disc table;

a clamp member for clamping the optical disc jointly with the disc table, the optical disc being placed on the disc table; and a hold mechanism for rotatably holding the clamp member, which causes the clamp member to shift toward the disc table with the axis of the clamp member being substantially parallel to the axis of the disc table when the clamp member clamps the optical disc jointly with the disc table, and causes the clamp member to shift away from the disc table with the axis of the clamp member being inclined against the axis of the disc table when the clamp member releases the clamp state of the optical disc clamped by the clamp member and the disc table.

Also, the above object can be attained by providing a disc drive apparatus including:

a rotation drive mechanism for driving or rotating an optical disc, which has a disc table onto which the optical disc is to be placed, and a motor for rotating the disc table;

a clamp member for clamping the optical disc jointly with the disc table, which has a clamp plate which is to be abutted to the optical disc, the optical disc being placed on the disc table; and a hold mechanism for rotatably holding the clamp member, which causes the clamp plate to shift toward the disc table with the clamp plate being substantially parallel to the optical disc when the clamp member clamps the optical disc jointly with the disc table, and causes the clamp plate to shift away from the disc table with the clamp plate being inclined against the optical disc when the clamp member releases the clamp state of the optical disc clamped by the clamp member and the disc table.

Also, the above object can be attained by providing a disc drive apparatus including:

a rotation drive mechanism for driving or rotating an optical disc, which has a disc table onto which the optical disc is to be placed, and a motor for rotating the disc table;

an optical pickup for irradiating a laser beam to the optical disc, the optical pickup being arranged over the optical disc;

a clamp member for clamping the optical disc jointly with the disc table, the optical disc being placed on the disc table;

a hold mechanism for rotatably holding the clamp member, which causes the clamp member to shift toward the disc table with the axis of the clamp member being substantially parallel to the axis of the disc table when the clamp member clamps the optical disc jointly with the disc table, and causes the clamp member to shift away from the disc table with the axis of the clamp member being inclined against the axis of the disc table when the clamp member releases the clamp state of the optical disc clamped by the clamp member and the disc table;

a support stand on which the rotation drive mechanism and the optical pickup are arranged; and a pivot mechanism for causing the support stand to pivot upward to clamp the optical disc, and for causing the support stand to pivot downward to release the clamp state of the optical disc.

The pivot mechanism causes the support stand to pivot upward, while concurrently the hold mechanism being caused to pivot downward, which causes the clamp member to shift toward the disc table to clamp the optical disc. Also, the pivot mechanism causes the support stand to pivot downward, while concurrently the hold mechanism being caused to pivot upward, which causes the clamp member to shift away from the disc table to release the clamp state of the optical disc.

These objects and other objects, features and advantages of the present invention will become more apparent from the following detailed description of the preferred embodiments of the present invention.

BEST MODE FOR CARRYING OUT THE INVENTION

The disc player employing the present invention will further be described below concerning the best modes with reference to the accompanying drawings.

Figure 3:
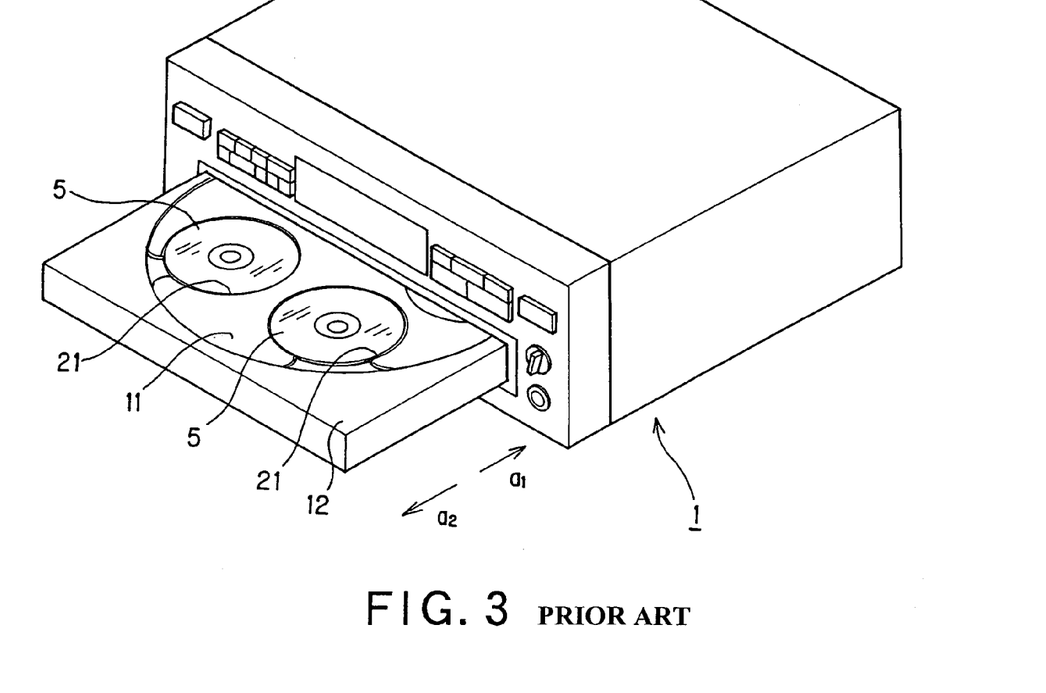
FIG. 3 shows a perspective view of a disc player according to the present invention.
Figure 4:
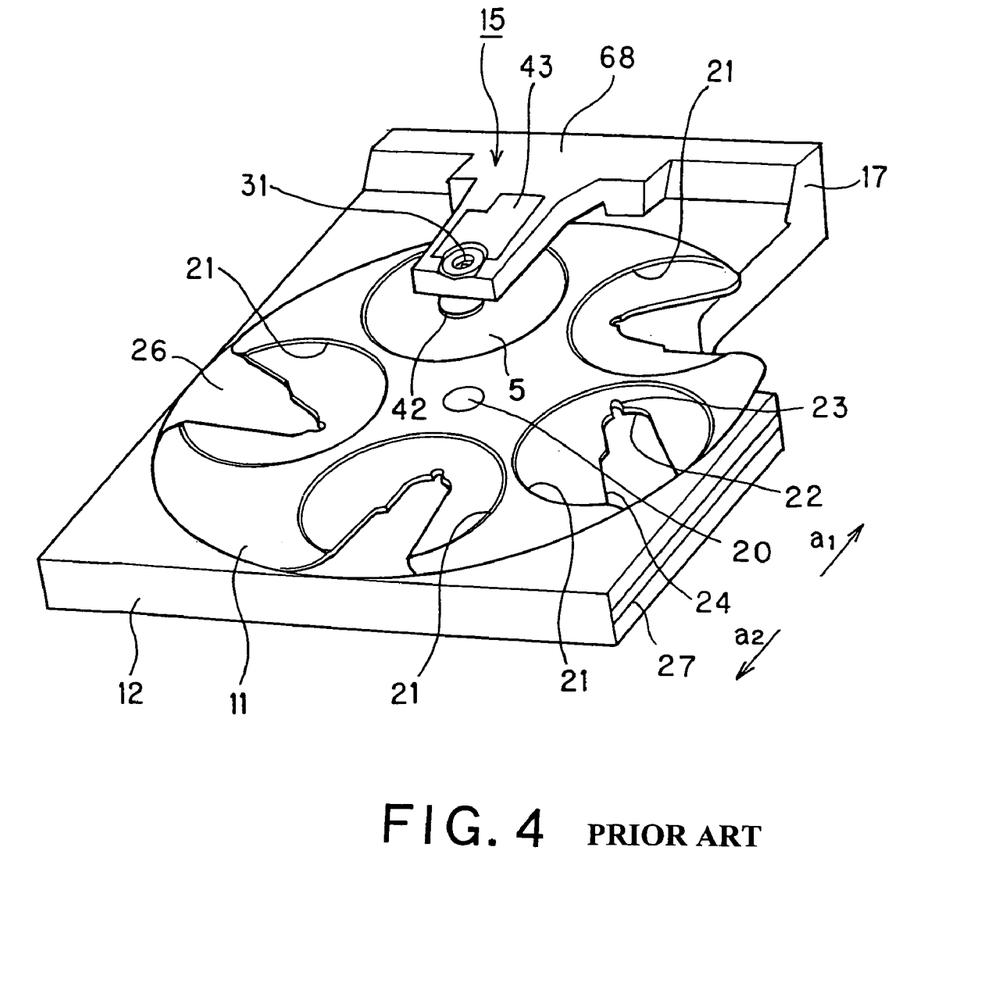
FIG. 4 shows a perspective view of the main portion of the disc player according to the present invention.

The disc player 1 according to the present invention includes a disc tray 11 onto which a plurality of optical discs 5 are to be placed, a slide tray 12 for rotatably supporting the disc tray 11, as shown in FIG. 3 and FIG. 4, a loading mechanism, not shown, for sliding the slide tray 12 along the directions of arrows $a_1$ and $a_2$, and a tray drive or rotation mechanism, not shown, for driving or rotating the disc tray 11.

Figure 5:
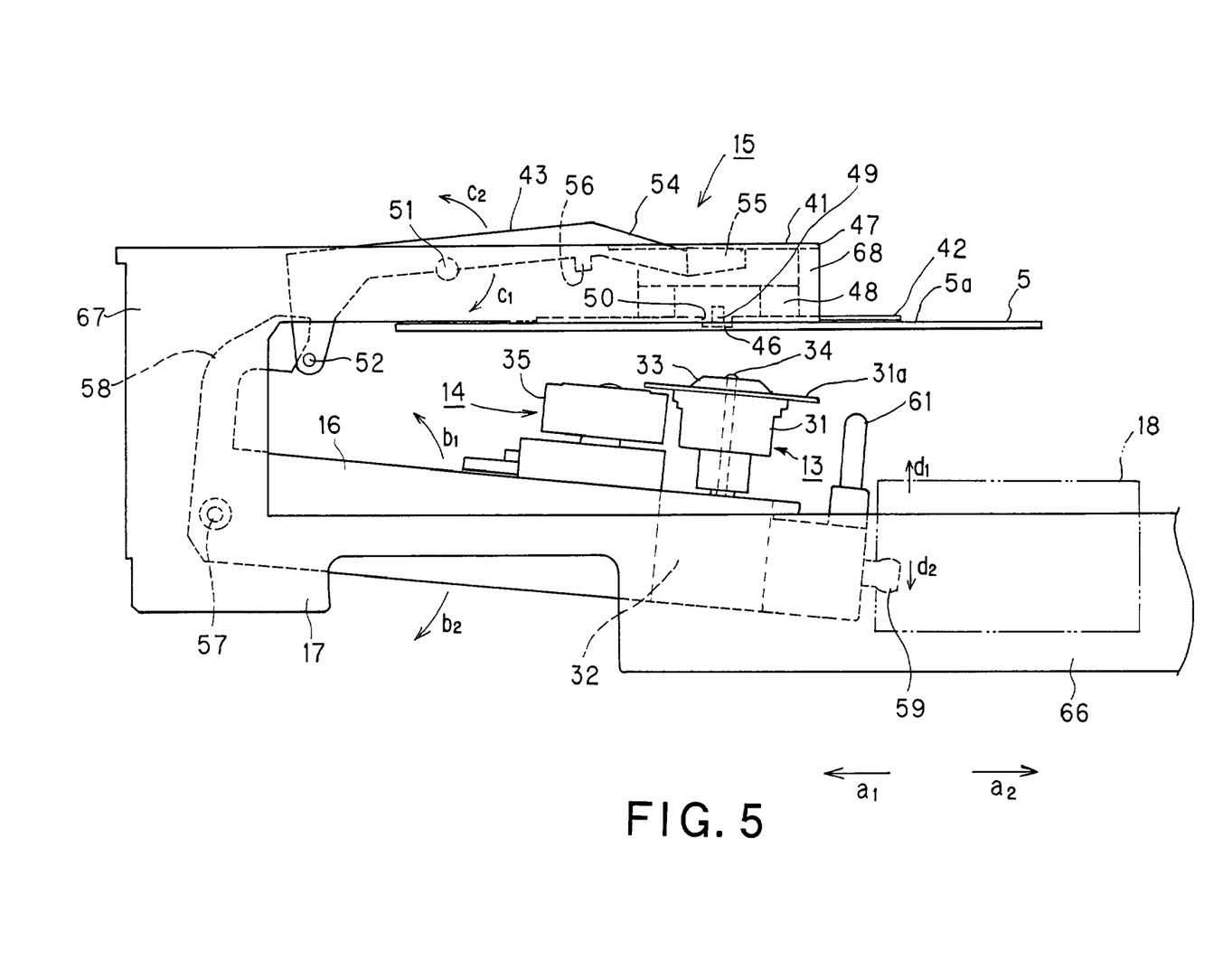
FIG. 5 shows a side view of a clamp mechanism according to the present invention.

The disc player 1 includes a disc rotation drive mechanism 13 for driving or rotating the optical disc 5, a reproduction mechanism 14 for reproducing information recorded on the optical disc 5, a clamp mechanism 15 for rotatably clamping the optical disc 5, a support stand 16 for supporting the disc rotation drive mechanism 13 and the reproduction mechanism 14, a support base 17 for supporting the clamp mechanism 15 and the support stand 16, and a pivot mechanism 18 for causing the support stand 16 to pivot upward and downward or along the directions of arrows $b_1$ and $b_2$, as shown in FIG. 5.

The disc tray 11 is substantially of a disc shape, and is rotatably supported by the slide tray 12 with a rotation shaft 20 being its rotation center, as shown in FIG. 4. The disc tray 11 has the main surface which is provided with a plurality of disc placement recesses 21 onto which a plurality of optical discs 5 are to be placed along the outer circumference thereof.

Each of the disc placement recesses 21 is provided with an opening 22 for causing the disc rotation drive mechanism 13 to face a center hole of the optical disc 5 to drive the optical disc 5. The opening 22 has a positioning cut 23 for positioning the disc placement recess 21 toward the disc rotation drive mechanism 13. The disc placement recess 21 has an opening 24 for causing the reproduction mechanism 14 to face the optical disc 5 to reproduce information recorded thereon, which spreads out from the opening 22 to the outer circumference of the disc tray 11.

The slide tray 12 is substantially of a rectangular shape, and has a tray placement member 26 on the main surface thereof onto which the disc tray 11 is rotatably placed, as shown in FIG. 4. The slide tray 12 has guide members 27, 27 at both opposite sides thereof. The guide members 27, 27 are so arranged as to be parallel to each other along the directions of arrows $a_1$ and $a_2$ shown in FIG. 4. The slide tray 12 has the guide members 27, 27 held by guide rails, not shown, arranged on the support base 17, which enables the slide tray 12 to slide along the $a_1$ and $a_2$ directions.

The loading mechanism, not shown, has a bunch of gears engaged with and arranged on a rack member of the slide tray 12, and a motor for driving or rotating the gears. The loading mechanism drives the gears to cause the slide tray 12 to slide to a setting/taking-out position where the optical disc 5 is set/taken out onto/from the disc tray 11, and to a playback position where information recorded on the optical disc 5 is reproduced.

A tray drive or rotation mechanism, not shown, is arranged at the bottom of the slide tray 12, which has a gear engaged with the rotation shaft 20 for rotatably holding the disc tray 11, and a motor for driving or rotating the gear. The tray drive or rotation mechanism drives or rotates the disc tray 11 supported by the slide tray 12 to relocate a desired one of the disc placement recesses 21 to the front side of the slide tray 12, which enables the setting/taking-out operation for the optical disc 5 onto/from the disc tray 11.

The disc rotation drive mechanism 13 includes a disc table 31 onto which the optical disc 5 is to be placed for loading, and a spindle motor 32 for driving or rotating the disc table 31, as shown in FIG. 5. The disc table 31 is substantially of a cylindrical shape, and is made of metallic material having magnetism. The disc table 31 has a disc placement member 31a in the shape of a flange at the outer circumference of one cylinder end thereof, onto which the optical disc 5 is to be placed. Also, at the same cylinder end, the disc table 31 has an engagement member 33 substantially of a cylindrical shape at the inner circumference thereof, which is to be engaged with a center hole of the optical disc 5. The spindle motor 32 has a spindle shaft 34 which penetrates the disc table 31. The end of the spindle shaft 34 protrudes from the top surface of the engagement member 33 of the disc table 31.

The reproduction mechanism 14 includes an optical pickup 35 for reproducing information recorded on the optical disc 5, as shown in FIG. 5, and a shift mechanism, not shown, for causing the optical pickup 35 to shift along the radial direction of the optical disc 5. The optical pickup 35 includes an optical unit which has an objective lens for causing a laser beam to focus on the recording surface of the optical disc 5, and a lens shift unit for driving or shifting the objective lens along directions parallel to and perpendicular to the optical axis thereof, respectively. The shift mechanism has a support base for supporting the optical pickup 35, a main shaft and a jack shaft for holding the support base such that the support base can shift along the radial direction of the optical disc 5, and a thread motor for causing the support base to shift, which components are not shown.

The clamp mechanism 15 includes a clamp member 41 for rotatably clamping the optical disc 5, a clamp plate 42 in the shape of a disc which is to be abutted to the optical disc 5, and an operation arm 43 for causing the clamp member 41 to shift toward and away from the disc table 31, as shown in FIG. 5.

The clamp member 41 is substantially of a cylindrical shape, and includes an engagement protrusion 46 which is to be engaged with the inner circumference of the engagement member 33 of the disc table 31, and a flange 47 which is held by the operation arm 43, as shown in FIG. 5. The clamp member 41 has a magnet 48 in the shape of a crown at the outer circumference of the engagement protrusion 46, which attracts the disc placement member 31a of the disc table 31. The engagement protrusion 46 is substantially of a cylindrical shape, and is provided with a shaft hole 49 to which the end of the spindle shaft 34 is to be inserted. The flange 47 is arranged at the outer circumference of one end of the clamp member 41. The magnet 48 is arranged at the outer circumference of the engagement protrusion 46.

The clamp plate 42 has an engagement hole 50 at its center portion, and the outer circumference of the engagement protrusion 46 of the clamp member 41 is engaged with the engagement hole 50.

Figure 6:
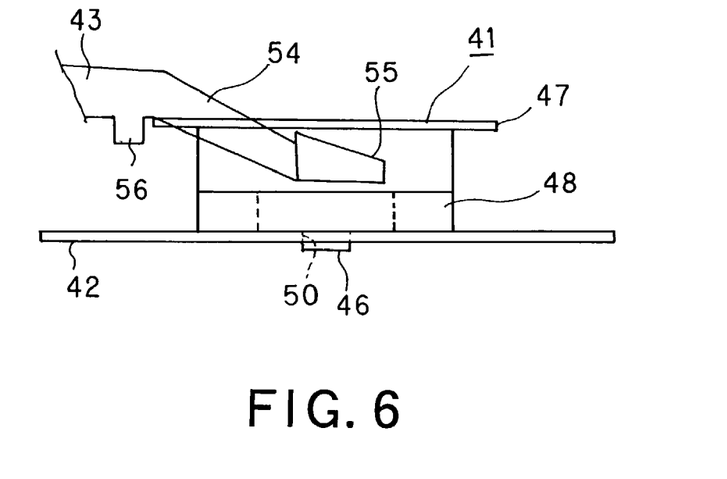
FIG. 6 shows a side view of the main portion of the clamp mechanism according to the present invention.

The operation arm 43 has pivot shafts 51, 51 unitedly formed at substantially the halfway portion along the longitudinal direction of both opposite sides thereof, which is held by the support base 17, and allows the operation arm 43 to pivot upward and downward or along the directions of arrows $c_1$ and $c_2$ shown in FIG. 5. Also, the operation arm 43 has an operation shaft 52 at one end thereof, which is to be operated by the support stand 16 to cause the operation arm 43 to pivot along the $c_1$ and $c_2$ directions. The operation arm 43 has a pair of hold members 54, 54 unitedly formed for holding the flange 47 of the clamp member 41, as shown in FIG. 5. The hold members 54, 54 are so arranged as to face each other at the outer circumference of the clamp member 41, and the hold members 54, 54 have holders 55, 55, respectively, at the end thereof for holding the clamp member 41, as shown in FIG. 6. The holders 55, 55 are so arranged as to face the flange 47, and are formed each in a tapered shape such that its thickness is reduced gradually as getting closer from the basal portion, which is adjacent to the end of the operation arm 43, to the end thereof.

Thus, when the operation arm 43 is caused to pivot along the $c_2$ direction with the pivot shafts 51, 51 being its pivot center, the holders 55, 55 of the hold members 54, 54 are gradually abutted to the flange 47 of the clamp member 41 from the basal portions to the ends thereof. That is, firstly, the basal portions of the holders 55, 55 are abutted to the flange 47, and finally, the ends of the holders 55, 55 are abutted to the flange 47, which brings about inclination between axes of the clamp member 41 and the disc table 31. Since the axis of the clamp member 41 is caused to be inclined against the axis of the disc table 31, one end of the outer circumference of the clamp plate 42 of the clamp member 41 is firstly caused to be released and shift away from the optical disc 5. That is, the clamp plate 42 of the clamp member 41 is caused to shift away from the optical disc 5 by the operation arm 43 with its surface not parallel to but inclined against the optical disc 5.

The operation arm 43 has a restraint member 56 for restraining the pivot operation thereof along the $c_1$ direction, which is so arranged as to face the support base 17, as shown in FIG. 5. When the restraint member 56 is abutted to the support base 17, the pivot operation of the operation arm 43 along the $c_1$ direction is caused to be restrained or suspended.

The support stand 16 is substantially of a rectangular block shape, and the disc rotation drive mechanism 13 and the reproduction mechanism 14 are so arranged on the main surface of the support stand 16 as to face the clamp mechanism 15, respectively, as shown in FIG. 5. The support stand 16 has pivot shafts 57, 57 at one end thereof, which is held by the support base 17 and allows the support stand 16 to pivot along the directions of arrows $b_1$ and $b_2$ shown in FIG. 5. The support stand 16 has, at the same end, an operation member 58 unitedly and protuberantly formed in the shape of a hook for operating the operation shaft 52 of the operation arm 43. The operation member 58 has its end related with the operation shaft 52. The support stand 16 is caused to pivot by a pivot mechanism 18, to be described later, along the $b_1$ and $b_2$ directions with the pivot shafts 57, 57 being its pivot center, and concurrently causes the operation arm 43 of the clamp mechanism 15 to pivot along the $c_1$ and $c_2$ directions with the pivot shafts 51, 51 being its pivot center by means of the operation member 58.

The support stand 16 has an engagement shaft 59 at the other end thereof, which is engaged with the pivot mechanism 18, as shown in FIG. 5. And, the support stand 16 is caused to pivot along the $b_1$ and $b_2$ directions by the pivot mechanism 18 via the engagement shaft 59. The support stand 16 has a positioning shaft 61 for positioning the optical disc 5 placed on each disc placement recess 21 toward the disc table 31 when each disc placement recess 21 of the disc tray 11 is relocated at the support stand 16. When the support stand 16 has the positioning shaft 61 engaged with the positioning cut 23 of each disc placement recess 21 of the disc tray 11 driven or rotated by the tray drive or rotation mechanism, not shown, the disc placement recess 21 is positioned toward the disc table 31.

The support base 17 is substantially of a U shape in its cross section, and has a main base 66 for slidably supporting the slide tray 12 along the $a_1$ and $a_2$ directions, a rear member 67 which holds the pivot shafts 57, 57 for allowing the support stand 16 to pivot along the $b_1$ and $b_2$ directions, and a ceiling member 68 which holds the pivot shafts 51, 51 for allowing the operation arm 43 to pivot along the $c_1$ and $c_2$ directions, as shown in FIG. 5. The main base 66 of the support base 17 is provided with an opening, not shown, in which the support stand 16 is so arranged as to be able to pivot along the $b_1$ and $b_2$ directions. The rear member 67 has a bearing which holds the pivot shafts 57, 57 of the support stand 16, enabling pivot operation thereof. The ceiling member 68 has a bearing which holds the pivot shafts 51, 51 of the operation arm 43, enabling pivot operation thereof.

The pivot mechanism 18 has a cam for shifting the engagement shaft 59 of the support stand 16, and a bunch of gears for driving or rotating the cam, which components are not shown, and the cam and the gears are linked with the loading mechanism to be operated. The cam is engaged with the engagement shaft 59, and has an opening for shifting the engagement shaft 59 upward and downward or along the directions of arrows $d_1$ and $d_2$ shown in FIG. 5 at the outer circumference thereof. When the cam is driven or rotated, the support stand 16 is caused to pivot along the $b_1$ and $b_2$ directions via the engagement shaft 59 arranged in the opening of the cam.

Next, an operation of the disc player 1 for clamping the optical disc 5 by the clamp mechanism 15, and that for releasing the clamp state of the optical disc 5 clamped by the clamp mechanism 15 will be explained.

At first, when the disc tray 11 of the disc player 1 is driven or rotated, the optical disc 5 placed on one of the disc placement recesses 21 is caused to shift to a position between or facing the disc table 31 and the clamp member 41.

Figure 7:
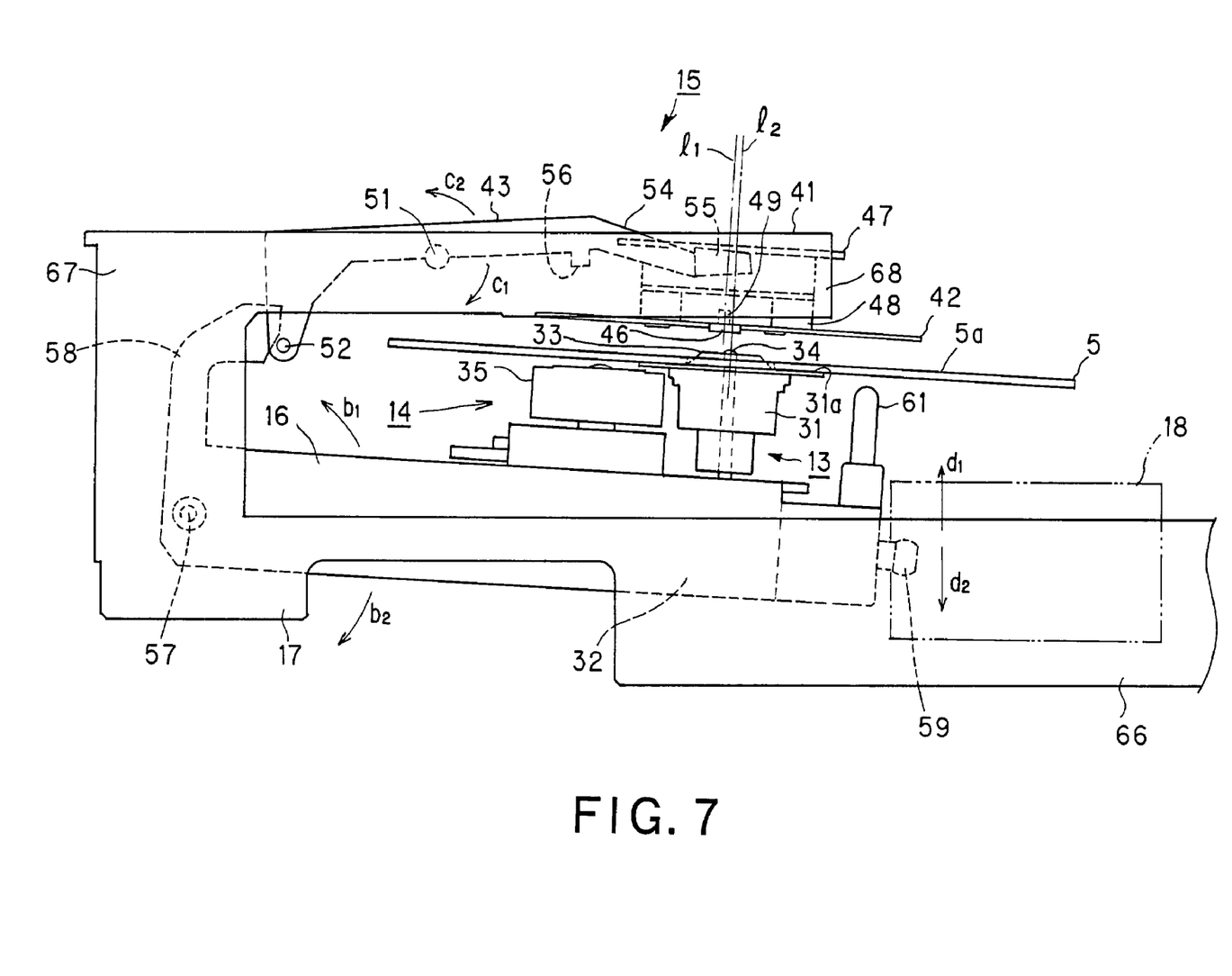
FIG. 7 shows a side view of the clamp mechanism according to the present invention, in which a clamp member of the clamp mechanism is caused to shift toward an optical disc placed on a disc table.

When the cam of the pivot mechanism 18 of the disc player 1 is driven or rotated, the engagement shaft 59 of the support stand 16 is caused to shift along the $d_1$ direction, as shown in FIG. 5 and FIG. 7. When the engagement shaft 59 is caused to shift along the $d_1$ direction, the support stand 16 which supports the disc rotation drive mechanism 13 and the reproduction mechanism 14 is caused to pivot along the $b_1$ direction with the pivot shafts 57, 57 being its pivot center. Thus, since the support stand 16 is caused to pivot along the $b_1$ direction, the disc table 31 is caused to shift toward the clamp member 41, and then the optical disc 5 is placed onto the disc table 31.

When the support stand 16 is caused to pivot along the $b_1$ direction shown in FIG. 5, the operation arm 43 is caused to pivot along the $c_1$ direction with the pivot shafts 51, 51 being its pivot center. Since the operation arm 43 is caused to pivot along the $c_1$ direction, the hold members 54, 54 also are caused to pivot along the $c_1$ direction shown in FIG. 7, while the clamp member 41 held by the hold members 54, 54 are caused to shift toward the disc table 31.

When the clamp member 41 is caused to shift toward the optical disc 5 placed on the disc table 31 by the operation arm 43, the flange 47 of the clamp member 41 is held by all the surface of the holders 55, 55 of the hold members 54, 54 of the operation arm 43, as shown in FIG. 7. Thus, the main surface of the clamp plate 42 of the clamp member 41 is caused to be substantially parallel to a label surface 5a of the optical disc 5 placed on the disc table 31.

So, the clamp plate 42 of the clamp member 41 is caused to shift toward the optical disc 5 placed on the disc table 31, and is abutted thereto, with the main surface of the clamp plate 42 being substantially parallel to the label surface 5a of the optical disc 5, as shown in FIG. 7.

That is, the clamp plate 42 of the clamp member 41 is caused to shift toward the optical disc 5 placed on the disc table 31, and is abutted thereto, with the axis of the clamp member 41 being substantially parallel to the axis of the disc table 31. Since the clamp plate 42 of the clamp member 41 is caused to shift toward the optical disc 5 placed on the disc table 31 in a desired state in which the main surface of the clamp plate 42 is substantially parallel to the label surface 5a of the optical disc 5, the main surface the clamp plate 42 is not abutted to the label surface 5a of the optical disc 5 obliquely or unequally, and thus the clamp member 41 can clamp the optical disc 5 properly.

Figure 8:
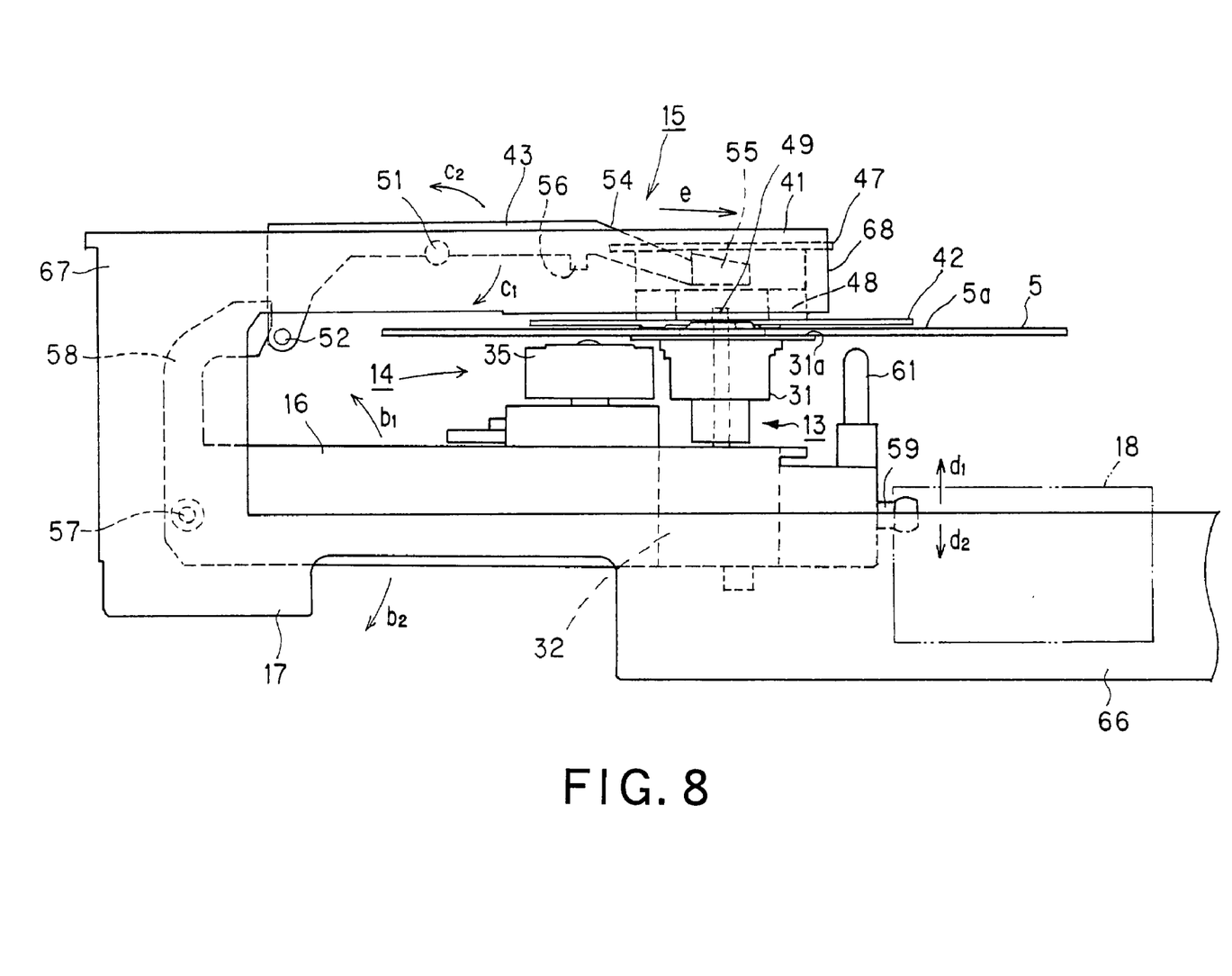
FIG. 8 shows a side view of the clamp mechanism according to the present invention, in which the optical disc is clamped by the clamp member of the clamp mechanism.

Then, the operation arm 43 is further caused to pivot along the $c_1$ direction, as shown in FIG. 8. Thus, the clamp member 41 is caused to shift along the direction of an arrow e shown in FIG. 8 in line with the holders 55, 55 of the hold members 54, 54 of the operation arm 43, and thus the axis $l_1$ of the clamp member 41 shown in FIG. 7 is caused to shift toward the axis $l_2$ of the disc table 31 shown in the same FIG. with the parallelism thereof substantially maintained. So, the clamp member 41 is positioned properly toward the disc table 31, which enables the clamp member 41 to clamp the optical disc 5 properly.

After the clamp member 41 is caused to shift toward the disc table 31, the clamp plate 42 is abutted to the optical disc 5 placed on the disc table 31, and the magnet 48 attracts the disc placement member 31a of the disc table 31, as shown in FIG. 8. Thus, the optical disc 5 placed on the disc table 31 is sandwiched or clamped between the clamp plate 42 of the clamp member 41 and the disc table 31, which enables the optical disc 5 to be driven or rotated unitedly with the disc table 31 and the clamp plate 42.

The disc player 1 drives or rotates the optical disc 5 placed on the disc table 31 by means of the disc rotation drive mechanism 13, while irradiating a laser beam to the optical disc 5 from the optical pickup 35 of the reproduction mechanism 14. Concurrently, the optical pickup 35 is caused to shift along the radial direction of the optical disc 5 to reproduce information recorded on the optical disc 5.

On the other hand, when releasing the clamp state of the optical disc 5 clamped by the clamp member 41, the pivot mechanism 18 drives or rotates the cam to cause the engagement shaft 59 of the support stand 16 to shift along the $d_2$ direction shown in FIG. 8. Then, the support stand 16 is caused to pivot along the $b_2$ direction with the pivot shafts 57, 57 being its pivot center.

Since the support stand 16 is caused to pivot along the $b_2$ direction shown in FIG. 8, the disc table 31 on which the optical disc 5 is placed is caused to shift away from the clamp member 41, while the operation arm 43 is caused to pivot along the $c_2$ direction shown the same FIG. with the pivot shafts 51, 51 being its pivot center.

Figure 9:
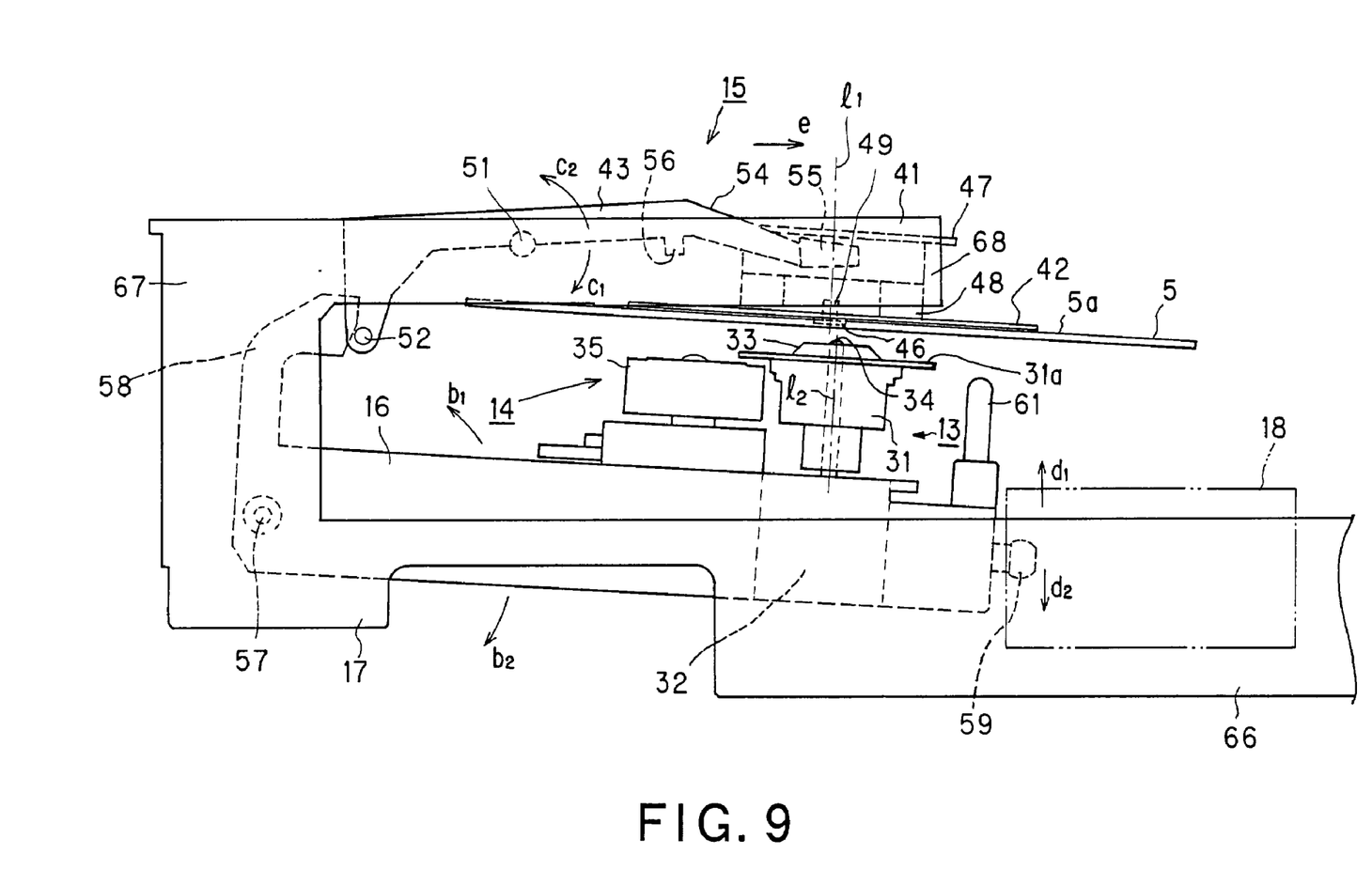
FIG. 9 shows a side view of the clamp mechanism according to the present invention, in which the clamp state of the optical disc clamped by the clamp member of the clamp mechanism is released.
Figure 10:
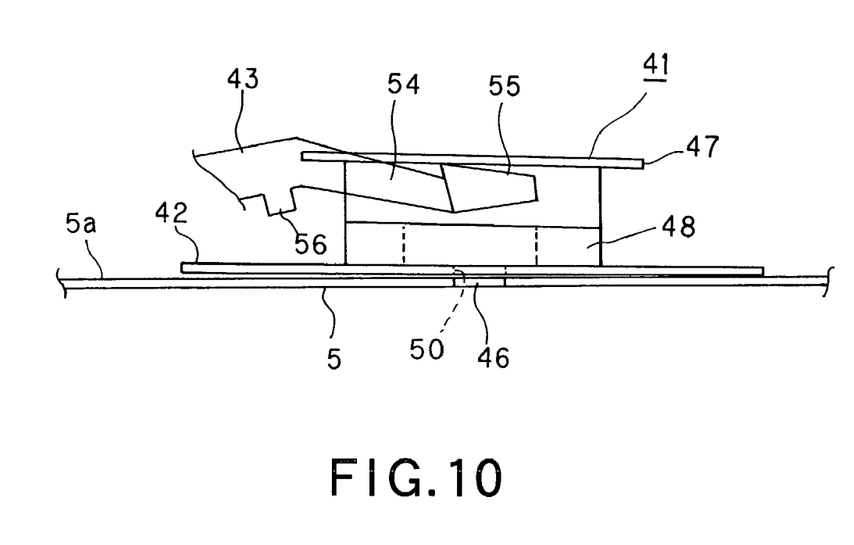
FIG. 10 shows a side view of the main portion of the clamp mechanism according to the present invention, in which a clamp plate of the clamp member is caused to shift away from the optical disc.

When the operation arm 43 is caused to pivot along the $c_2$ direction, the holders 55, 55 of the hold members 54, 54 are gradually abutted to the flange 47 of the clamp member 41 from the basal portion to the end thereof, as shown in FIG. 9 and FIG. 10. Thus, the axis $l_1$ of the clamp member 41 is caused to be inclined against the axis $l_2$ of the disc table 31, as shown in FIG. 7, and the clamp plate 42 of the clamp member 41 is gradually caused to shift away from the optical disc 5 from one end of the outer circumference thereof.

After the operation arm 43 is caused to pivot along the $c_2$ direction shown in FIG. 9, and all the surface of the holders 55, 55 of the hold members 54, 54 are abutted to the flange 47 of the clamp member 41, the clamp member 41 is caused to shift away from the disc table 31 with the axis $l_1$ of the clamp member 41 being inclined against the axis $l_2$ of the disc table 31.

Thus, when releasing the clamp state of the optical disc 5 clamped by the clamp member 41, since the axis $l_1$ of the clamp member 41 is inclined against the axis $l_2$ of the disc table 31, the clamp plate 42 is caused to shift away from the optical disc 5 with their axes being inclined against each other, as shown in FIG. 9. Thus, the clamp plate 42 is detached or caused to shift away from the optical disc 5 easily, even though the label surface 5a has adhesion. Also, since the clamp plate 42 is caused to shift away from the optical disc 5 with the main surface the clamp plate 42 and the label surface 5a of the optical disc 5 being not parallel to each other, shift amount of the clamp member 41 can be reduced as compared with the conventional case in which the clamp plate 42 is caused to shift away from the optical disc 5 with the main surface the clamp plate 42 and the label surface 5a of the optical disc 5 being parallel to each other.

Then, the support stand 16 is further caused to pivot along the $b_2$ direction shown in FIG. 9, and the disc table 31 is further caused to shift away from the clamp member 41. And then, the optical disc 5 placed on the disc table 31 is caused to be placed on the disc placement recess 21.

The tray drive or rotation mechanism drives or rotates the disc tray 11 to relocate the disc placement recesses 21 having the optical disc 5 placed thereon to the front side of the slide tray 12, and the loading mechanism causes the slide tray 12 to shift along the $a_2$ direction. Thus, the disc placement recess 21 having the optical disc 5 placed thereon is withdrawn from the disc player 1, which enables the taking-out operation of the optical disc 5 from the disc tray 11, as shown in FIG. 3.

As in the above, according to the disc player 1 of the present invention, when releasing the clamp state of the optical disc 5 clamped by the clamp member 41, since the axis $l_1$ of the clamp member 41 is caused to be inclined against the axis $l_2$ of the disc table 31, the main surface of the clamp plate 42 of the clamp member 41 is gradually caused to shift away from the optical disc 5 from one end of the outer circumference thereof. Thus, the optical disc 5 whose label surface 5a has adhesion can be prevented from sticking to the clamp plate 42, which can improve clamp operation for the optical disc 5.

Furthermore, according to the disc player 1 of the present invention, when clamping the optical disc 5 placed on the disc table 31 by the clamp member 41, the main surface of the clamp plate 42 of the clamp member 41 is caused to shift toward the label surface 5a of the optical disc 5, and is abutted thereto, with the main surface of the clamp plate 42 being substantially parallel to the label surface 5a of the optical disc 5. Thus, the clamp member 41 can clamp the optical disc S properly, which also can improve clamp operation for the optical disc 5.

Furthermore, according to the disc player 1 of the present invention, when clamping the optical disc 5 placed on the disc table 31 by the clamp member 41, the clamp member 41 is caused to shift in line with the holders 55, 55 of the hold members 54, 54 of the operation arm 43, and thus the axis $l_1$ of the clamp member 41 is caused to shift toward the axis $l_2$ of the disc table 31 with the parallelism thereof substantially maintained. So, the clamp member 41 can clamp the optical disc 5 properly, which also can improve clamp operation for the optical disc 5.

As has been described in the above explanation, the disc player of the present invention is configured or adapted to reproduce information recorded on an optical disc. On the other hand, the disc player of the present invention can be so configured as to reproduce information recorded on a magneto-optical disc by arranging a magnetic head at the reproduction mechanism.

INDUSTRIAL APPLICABILITY

As in the above, according to the disc drive apparatus of the present invention, an optical disc whose label surface has adhesion can be prevented from sticking to a clamp plate of a clamp member, which can improve clamp operation for the optical disc.

What is claimed is:

1. A disc drive apparatus comprising:
a rotation drive mechanism configured to drive or rotate an optical disc, which has a disc table onto which the optical disc is to be placed, and a motor for rotating the disc table;
a clamp member configured to clamp the optical disc jointly with the disc table, the optical disc being placed on the disc table;
a hold mechanism configured to rotatably hold the clamp member, which causes the clamp member to shift toward the disc table with an axis of the clamp member being substantially perpendicular to a top surface of the disc table when the clamp member clamps the optical disc jointly with the disc table, and causes the clamp member to shift away from the disc table with the axis of the clamp member being inclined at an obtuse angle against the top surface of the disc table in the direction of the hold mechanism when the clamp member releases the clamp state of the optical disc clamped by the clamp member and the disc table;
wherein the hold mechanism has a hold section configured to hold the clamp member, and a hold arm by which the clamp member is rotatably held and the hold section is formed in a tapered shape such that its thickness is reduced gradually from the basal portion to the end thereof.

2. A disc drive apparatus comprising:
a rotation drive mechanism configured to drive or rotate an optical disc, which has a disc table onto which the optical disc is to be placed, and a motor for rotating the disc table;
a clamp member configured to clamp the optical disc jointly with the disc table, which has a clamp plate which is to be abutted to the optical disc, the optical disc being placed on the disc table;
a hold mechanism configured to rotatably hold the clamp member, which causes the clamp plate to shift toward the disc table with the clamp plate being substantially perpendicular to a top surface the optical disc when the clamp member clamps the optical disc jointly with the disc table, and causes the clamp plate to shift away from the disc table with the clamp plate being inclined at an obtuse angle against a top surface of the optical disc in the direction of the hold mechanism when the clamp member releases the clamp state of the optical disc clamped by the clamp member and the disc table;
wherein the hold mechanism has a hold section configured to hold the clamp member, and a hold arm by which the clamp member is rotatably held and the hold section is formed in a tapered shape such that its thickness is reduced gradually from the basal portion to the end thereof and when the hold arm is rotated in a direction away from the optical disc, the hold section is abutted to a flange from the basal portion to the end of the hold mechanism so that the clamp member shifts from the basal portion side of the clamp plate to the optical disc.

3. A disc drive apparatus comprising:
a rotation drive mechanism configured to drive or rotate an optical disc, which has a disc table onto which the optical disc is to be placed, and a motor for rotating the disc table;
an optical pickup for irradiating a laser beam to the optical disc, the optical pickup being arranged over the optical disc;
a clamp member configured to clamp the optical disc jointly with the disc table, the optical disc being placed on the disc table;
a hold mechanism for rotatably holding the clamp member, which causes the clamp member to shift toward the disc table with an axis of the clamp member being substantially perpendicular to a top surface of the disc table when the clamp member clamps the optical disc jointly with the disc table, and causes the clamp member to shift away from the disc table with the axis of the clamp member being inclined at an obtuse angle against the top surface of the disc table in the direction of the hold mechanism when the clamp member releases the clamp state of the optical disc clamped by the clamp member and the disc table;
a support stand on which the rotation drive mechanism and the optical pickup are arranged; and
a pivot mechanism configured to pivot the support stand upward to clamp the optical disc, and pivot the support stand downward to release the clamp state of the optical disc.

4. The disc drive apparatus as set forth in claim 3, wherein the pivot mechanism causes the support stand to pivot upward, while concurrently the hold mechanism being caused to pivot downward, which causes the clamp member to shift toward the disc table to clamp the optical disc, and causes the support stand to pivot downward, while concurrently the hold mechanism being caused to pivot upward, which causes the clamp member to shift away from the disc table to release the clamp state of the optical disc.

5. The disc drive apparatus as set forth in claim 4, wherein the pivot mechanism has a cam for causing the support stand to pivot upward and downward, and the support stand has an engagement member which is engaged with the cam.

6. A disc drive apparatus comprising:

a rotation drive mechanism configured to drive or rotate an optical disc, which has a disc table onto which the optical disc is to be placed, and a motor for rotating the disc table;

an optical pickup for irradiating a laser beam to the optical disc, the optical pickup being arranged over the optical disc;

a clamp member configured to clamp the optical disc jointly with the disc table, the optical disc being placed on the disc table;

a hold mechanism configured to rotatably hold the clamp member, which causes the clamp member to shift toward the disc table with an axis of the clamp member being substantially perpendicular to a top surface of the disc table when the clamp member clamps the optical disc jointly with the disc table, and causes the clamp member to shift away from the disc table with the axis of the clamp member being inclined at an obtuse angle against the top surface of the disc table in the direction of the hold mechanism when the clamp member releases the clamp state of the optical disc clamped by the clamp member and the disc table;

a support stand on which the rotation drive mechanism and the optical pickup are arranged;

a pivot mechanism configured to pivot the support stand upward to clamp the optical disc, and to pivot the support stand downward to release the clamp state of the optical disc;

wherein the hold mechanism has a hold section configured to hold the clamp member, and a hold arm by which the clamp member is rotatably held and the hold section is formed in a tapered shape such that its thickness is reduced gradually from the basal portion to the end thereof.

7. A disc drive apparatus comprising:

a rotation drive mechanism configured to drive or rotate an optical disc, which has a disc table onto which the optical disc is to be placed, and a motor for rotating the disc table;

a clamp member configured to clamp the optical disc jointly with the disc table, the optical disc being placed on the disc table;

a hold mechanism configured to rotatably hold the clamp member, which causes the clamp member to shift toward the disc table with an axis of the clamp member being substantially perpendicular to a top surface of the disc table when the clamp member clamps the optical disc jointly with the disc table, and causes the clamp member to shift away from the disc table with the axis of the clamp member being inclined at an obtuse angle against the top surface of the disc table in the direction of the hold mechanism when the clamp member releases the clamp state of the optical disc clamped by the clamp member and the disc table;

means for inclining the axis of the clamp member relative to the axis of the disc table upon releasing the disc.

8. A disc drive apparatus comprising:

a rotation drive mechanism configured to drive or rotate an optical disc, which has a disc table onto which the optical disc is to be placed, and a motor for rotating the disc table;

a clamp member configured to clamp the optical disc jointly with the disc table, which has a clamp plate which is to be abutted to the optical disc, the optical disc being placed on the disc table;

a hold mechanism configured to rotatably hold the clamp member, which causes the clamp member to shift toward the disc table with an axis of the clamp member being substantially perpendicular to a top surface of the disc table when the clamp member clamps the optical disc jointly with the disc table, and causes the clamp member to shift away from the disc table with the axis of the clamp member being inclined at an obtuse angle against the top surface of the disc table in the direction of the hold mechanism when the clamp member releases the clamp state of the optical disc clamped by the clamp member and the disc table;

means for inclining the axis of the clamp member relative to the axis of the disc table upon releasing the disc.

9. A disc drive apparatus comprising:

a rotation drive mechanism configured to drive or rotate an optical disc, which has a disc table onto which the optical disc is to be placed, and a motor for rotating the disc table;

an optical pickup for irradiating a laser beam to the optical disc, the optical pickup being arranged over the optical disc;

a clamp member confugured to clamp the optical disc jointly with the disc table, the optical disc being placed on the disc table;

a hold mechanism configured to rotatably hold the clamp member, which causes the clamp member to shift toward the disc table with an axis of the clamp member being substantially perpendicular to a top surface of the disc table when the clamp member clamps the optical disc jointly with the disc table, and causes the clamp member to shift away from the disc table with the axis of the clamp member being inclined at an obtuse angle against the top surface of the disc table in the direction of the hold mechanism when the clamp member releases the clamp state of the optical disc clamped by the clamp member and the disc table;

a support stand on which the rotation drive mechanism and the optical pickup are arranged;

a pivot mechanism configured to pivot the support stand upward to clamp the optical disc, and to pivot the support stand downward to release the clamp state of the optical disc; and means for inclining the axis of the clamp member relative to the axis of the disc table upon releasing the disc.

* * * * *